Aug. 11, 1964      A. E. HEIN      3,144,124

TABLE TOP CHAIN LINK CONVEYOR CONSTRUCTION

Filed June 21, 1961

INVENTOR.
August E. Hein
BY
ATTORNEYS

United States Patent Office 3,144,124
Patented Aug. 11, 1964

3,144,124
TABLE TOP CHAIN LINK CONVEYOR
CONSTRUCTION
August E. Hein, Saginaw, Mich., assignor to Baker
Perkins Inc., Saginaw, Mich., a corporation of New
York
Filed June 21, 1961, Ser. No. 118,698
4 Claims. (Cl. 198—189)

This invention relates to a chain conveyor construction and more particularly to a conveyor composed of a plurality of sheet metal plates or links that are hinged one to another to form an endless conveyor having characteristics similar to those of an endless belt conveyor.

There are many instances where an endless belt conveyor is desirable but cannot be used. In such instances it has been common practice heretofore to provide an endless chain of plate-like links hingedly joined to one another so as to function in substantially the same manner as does an endless belt. Such chain conveyors conventionally include hinge knuckles extending from opposite edges and cooperable with similar hinge knuckles projecting from adjacent links to receive hinge pins which not only interconnect adjacent links but also enable the links to pivot relatively to one another about the axis of the respective hinge pins.

It is important to the proper functioning of a conveyor composed of plate-like links that two adjacent links pivot about the same axis and that the axis be located a uniform distance from the terminal edge of each link in order to avoid vertical displacement of the trailing edge of a link relative to the leading edge of the immediately following link when the links reach the end of a horizontal run. This result has been attained in the past by forming a pair of spaced apart loops on the adjacent edges of certain links to receive loops on alternate links which interfit therewith and provide an opening for the reception of hinge pins which form axes between the links and about which the adjacent links pivot.

In order to avoid inadvertent removal of the hinge pin from the hinge knuckles of adjacent links, it has been the practice heretofore to make use of a pin which has an interference fit with the pair of hinge knuckles in each case and which must be driven forcibly into the spaced apart hinge knuckles. When the chain is mounted on its supports and it is desired to disassemble the chain for some reason, it is sometimes difficult to remove and replace such pins. At the turning drums or pulleys, where the greatest tension is placed on the chain, joining of two adjacent links is particularly difficult and often at these regions access to the links is so confined that conventional tools cannot be effectively used to pound out and drive in the pins.

A prime object of this invention is to provide a chain link construction which permits adjacent links to be coupled to one another without the necessity of using force on the links themselves.

A further object of the invention is to provide a chain link construction wherein adjacent links may be readily coupled to or separated from one another at virtually any desired point on the conveyor, including locations where working space is quite limited.

Another object of the invention is to provide a chain link construction of the general class described which can be produced with existing machinery upon slight modification of the latter.

A further object of the invention is to provide a coupling between adjacent links of a chain which facilitates the joining of links one to another and offers resistance to their uncoupling so as to minimize the risk of inadvertent uncoupling of the links.

Other objects and advantages of the invention will be pointed out specifically or will become apparent from the following description when it is considered in conjunction with the appended claims and the accompanying drawing, in which:

Figure 1:
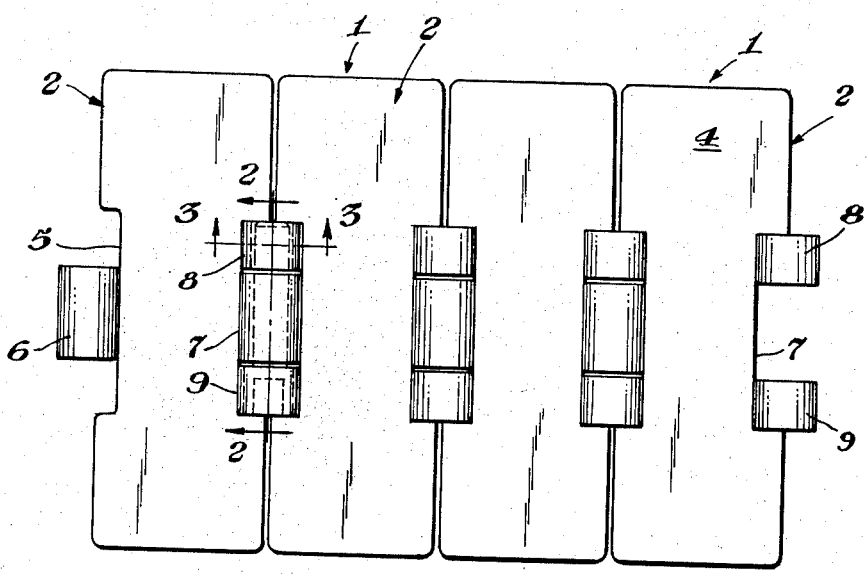
FIGURE 1 is a bottom plan view of a portion of an endless conveyor composed of links constructed in accordance with the invention.

Each link formed in accordance with the invention is identical, so only one need be described in detail. Each link is designated generally by the reference character 1 and comprises a substantially rectangular, sheet metal body member 2 having a flat upper surface 3 and a flat lower surface 4. One of the longer edges of the body is recessed as at 5 at its central portion except for a centrally located, laterally projecting flange or tongue which is downwardly and reversely rolled to form a substantially cylindrical, but incomplete loop or tubular knuckle element 6. The opposite edge of each body member also is centrally recessed as at 7 and is provided at the opposite ends of the recess with laterally projecting flanges or tongues that are downwardly and reversely rolled to form similar, aligned loops or tubular knuckle members 8 and 9. The knuckles 8 and 9 are spaced apart from one another a distance corresponding substantially to the length of the knuckle 6 so as to permit the latter to be freely received between the parts 8 and 9.

Figure 2:
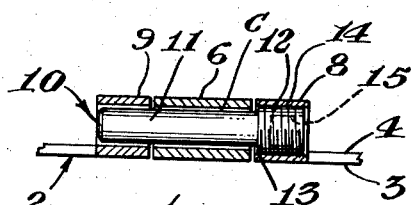
FIGURE 2 is a sectional view taken on the line 2—2 of FIGURE 1.
Figure 3:
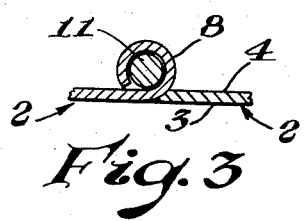
FIGURE 3 is a sectional view taken on the line 3—3 of FIGURE 1.

A coupling pin 10 is adapted to be inserted in the knuckles 6, 8, and 9 when the latter are aligned, so as pivotally to join two adjacent links together. The coupling pin includes a cylindrical shank 11 terminating at one end in a slightly enlarged head 12 that is provided with external threads 13. The internal dimension of each of the knuckles 6 and 9 should correspond substantially to the cross-sectional dimension of the shank 11 so as to permit the shank 11 freely to be inserted in and removed from the loops 6 and 9. In FIGURES 2 and 3 of the drawing the clearance "C" between the shank 11 and the loops 6 and 9 is exaggerated somewhat for clarity.

The interior dimension of the loop 8 is somewhat larger than the corresponding dimension of the loops 6 and 9 so as to correspond substantially to the diameter of the threaded head 13, and the interior surface of the knuckle 8 is threaded as at 14 to match the threading on the head of the pin. The enlargement of the bore of the knuckle 8 may be effected by the threading operation.

Links constructed in accordance with the invention can be manufactured with substantially the same equipment presently being used to manufacture links of known kinds. The only change required is to thread the interior of the loop 8.

The head 12 of the coupling pin preferably has a socket 15 formed therein for reception of one end of a wrench (not shown) of minimum length by means of which the pin may be threaded into and out of the knuckle 8.

To assemble a pair of adjacent links, the knuckle 6 of one link is interposed between the knuckles 8 and 9 of the adjacent link and the pin 10 inserted, shank end first, through the knuckles 8, 6, and 9. When the threads on the head 12 engage the threads in the knuckle 8, the pin may be rotated so as to feed the pin into the knuckle 8 until the pin occupies the position shown in FIGURE 2. In this position, the longitudinal axis of the pin lies midway between the adjacent links and forms the axis about which the links pivot.

To remove the pin, it is only necessary that the latter be rotated in the reverse direction to separate the threads of the head from the threads of the knuckle 8, whereupon the pin then may be withdrawn from the knuckles. The assembly and disassembly of the links of the conveyor therefore may be effected without the necessity of subjecting either the pin or any of the parts of the links to possible damage caused by hammering on the pin.

Preferably, the material from which the links are made is steel that is sufficiently thin to have some flexibility or resiliency and the hand of the thread formed in the loop 8 is opposite the hand on which the loop is rolled. In FIGURE 3, the loop is rolled counterclockwise to form a left hand loop. The threads 14, therefore, should be right hand threads. As a result, seating of the pin 10 within the loop 8 will be effected by clockwise rotation of the pin, and such rotation will tend to open the loop somewhat to facilitate entry therein of the head 12. Rotation of the pin in a counterclockwise direction, however, will cause the loop to tend to close, thereby gripping the head more tightly and minimizing the possibility of the pin's working loose.

The disclosed embodiment is representative of a presently preferred form of the invention, but is intended to be illustrative rather than definitive thereof. The invention is defined in the claims.

I claim:

1. A chain link construction comprising a body member formed of resilient material and having a flat upper surface; a pair of spaced apart flanges projecting from one side of said body member and being downwardly rolled from said upper surface to form a pair of spaced apart, aligned, substantially cylindrical but incomplete loops; a similar third loop projecting from the opposite side of said body member, the loops of said pair of loops being spaced from one another a distance corresponding substantially to the length of said third loop so as to enable the third loop of a similar, adjacent body member to be received therebetween; and a cylindrical coupling pin having its opposite ends removably received in said pair of loops and spanning the distance therebetween, one loop only of said pair of loops having a threaded bore the threads of which are formed in a direction opposite to the direction in which said one loop is rolled, the remaining loops having smooth bores, said coupling member having a threaded portion at one end only of the latter, said portion of said pin being in threaded engagement with the threads of the bore in said one loop, whereby said one loop exerts a frictional force on said coupling member tending to restrain relative rotation of said coupling member and said one loop in a direction to unthread the said coupling member from said one loop.

2. The construction set forth in claim 1 wherein the internal dimension of said one of said loops is different from the internal dimension of the remaining loops.

3. The construction set forth in claim 2 wherein said coupling pin has cross-sectional dimensions corresponding substantially to the internal dimensions of said loops.

4. The construction set forth in claim 1 wherein the internal dimension of said one of said loops is greater than the internal dimension of the other of said loops.

References Cited in the file of this patent

UNITED STATES PATENTS

| | | |
|---|---|---|
| 304,625 | Doubleday | Sept. 2, 1884 |
| 1,966,659 | Wynne et al. | July 17, 1934 |
| 3,036,695 | Thuerman | May 29, 1962 |